UNITED STATES PATENT OFFICE.

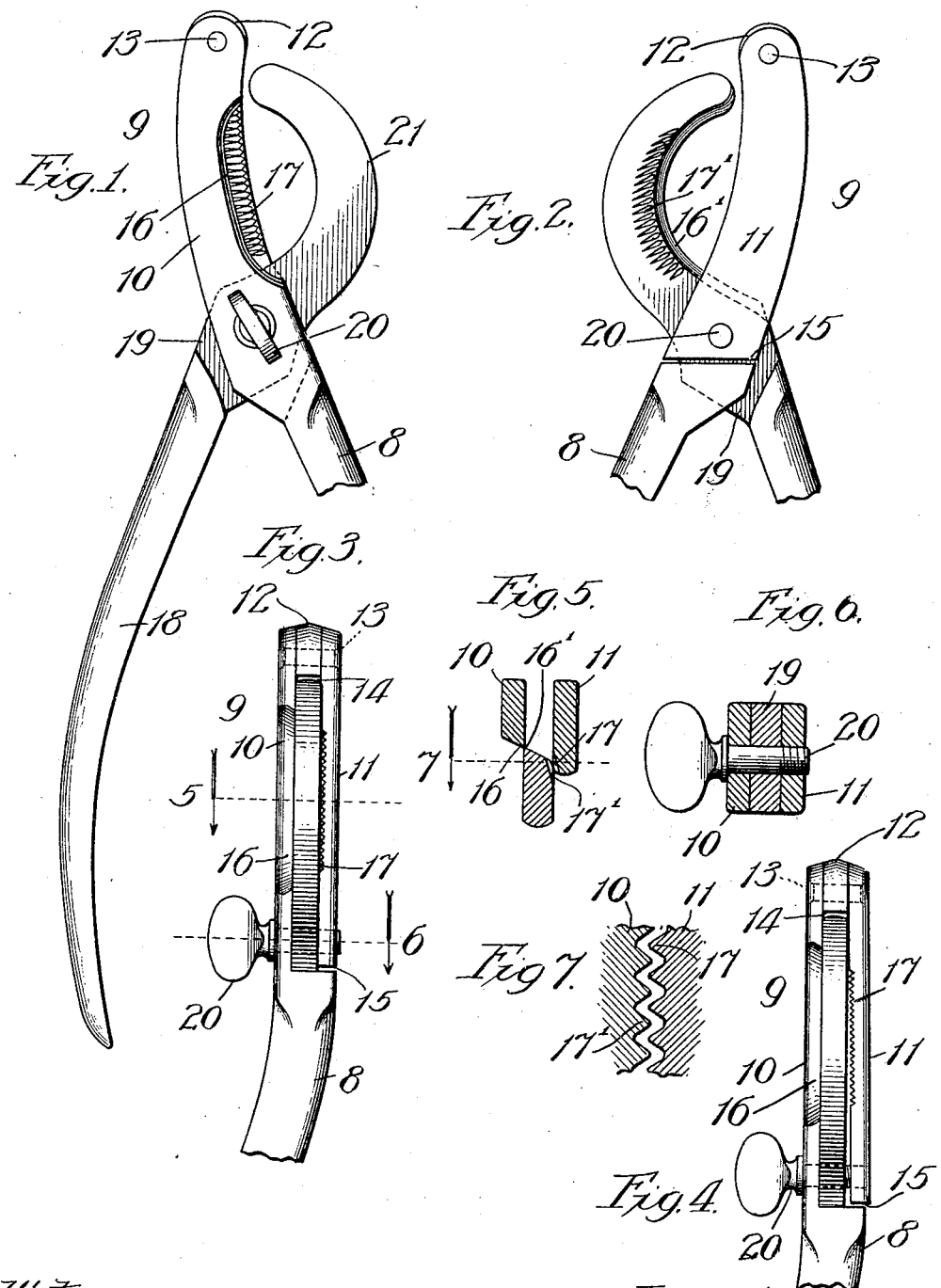

IRA PASLEY, OF OLDS, ALBERTA, CANADA, ASSIGNOR TO SHARP & SMITH, OF CHICAGO, ILLINOIS, A CORPORATION OF ILLINOIS.

EMASCULATOR.

998,920.  Specification of Letters Patent.  Patented July 25, 1911.

Application filed October 17, 1910. Serial No. 587,410.

*To all whom it may concern:*

Be it known that I, IRA PASLEY, a subject of the King of Great Britain, residing at Olds, Alberta, the Dominion of Canada, have invented a new and useful Improvement in Emasculators, of which the following is a specification.

My invention relates to an improvement in emasculators of the type involving a pair of handles pivoted together, like shears, one handle terminating beyond the pivot in a slightly-curved longitudinally-slotted blade having a knife-edge on one side of the slot and a serrated edge on the opposite side thereof, with the other handle terminating in an approximately semi-circular blade provided with a knife-edge on one side and a serrated edge on the opposite side to coöperate with the first-named corresponding parts.

The object of my invention is to improve the crushing action of the coöperating serrated edges of the instrument by adapting them to operate with equal facility, effectiveness and safety on both younger and older animals. This object is accomplished by the construction illustrated in the accompanying drawing, in which—

Figure 1 is a broken view in elevation showing one side of an emasculator of my improved construction; Fig. 2 is a similar view of the opposite side of the instrument; Fig. 3 shows the blades by an edge view, and Fig. 4 shows the same but with the adjustable spring-side of the slotted blade forced outwardly toward its free end; Figs. 5 and 6 are sections respectively on lines 5 and 6, Fig. 3, and Fig. 7 is a broken enlarged section on line 7, Fig. 5, showing the action of the teeth of the coöperating serrated edges of the instrument.

The handle 8 terminates at one end in a slightly-curved blade 9 formed with a side 10 integral with the handle, and a side 11 spaced at its forward end from the companion-side by an interposed block 12, through which the sides are permanently pivoted together by a pin or rivet 13, thereby forming the slot 14. The side 11 is free at its rear end 15 and thus separate from the handle 8, and being formed of steel and slightly sprung at that end, it tends to spread outwardly somewhat. The sides of the blade 9 are provided, respectively, with a concave knife-edge 16 and a serrated edge 17. The handle 18 is embraced at its flattened portion 19 in the slot between the sides of the head 9 and is connected therewith by a thumb-screw 20 threaded on its end which passes through a threaded opening on the free-end portion of the side 11; and this handle terminates in a solid curved blade 21 working in the slot 14 and provided with a knife-edge 16′ to coöperate with the opposing knife edge 16, and a serrated edge 17′ to coöperate with the serrated edge 17, the teeth on these serrated edges being relatively so disposed as to cause them to be staggered, as represented in Fig. 7.

To adjust the instrument for use on a young animal, the thumb-screw is tightened to narrow the opposing space between the serrated edges as much as possible, since the material of the part operated upon is relatively thin. The open blades are caused, in the usual way, to embrace the part to be severed, when, by manipulating the handles to close the blades, the coöperating knife-edges sever the part and the coöperating serrated edges squeeze the cord between them and crush the artery with a corrugating action because of the staggered relation of their teeth, thereby effectually closing it. If the serrated edges were used thus closely together on the thicker mass of material presented by the part to be operated on of an older animal, they would tend to sever the part there also, instead of effecting the mere desired crushing result; so that for such an animal the thumb-screw is turned to spread the side 11 outwardly toward its free end, as represented in Fig. 7, thereby widening the space between the coöperating serrated edges to adapt it to accommodate the greater mass of material of the part to be operated upon, and thus insure the crushing without tendency to cause the teeth to exert a severing action.

What I claim as new and desire to secure by Letters Patent is:

1. In an emasculator, the combination of a handle-equipped slotted blade having a knife-edge and a serrated edge respectively on the opposite sides of the slot, with said serrated side free at its rear end to adapt it to be adjusted relative to the opposite side, a handle-equipped blade pivotally connected with the first-named blade to work in the slot thereof and provided with a knife-edge and a serrated edge coöperating, respectively, with the corresponding parts of the slotted blade and means for adjusting the serrated side of the slotted blade, for the purpose set forth.

2. In an emasculator, the combination of a handle-equipped slotted blade having a knife-edge and a serrated edge respectively on the opposite sides of the slot, with said serrated side free at its rear end to adapt it to be adjusted relative to the opposite side, a handle-equipped blade pivotally connected with the first-named blade to work in the slot thereof and provided with a knife-edge coöperating with that of the slotted blade and a serrated edge having its teeth staggered with relation to those of the serrated edge of the slotted blade in coöperating therewith and means for adjusting the serrated side of the slotted blade, for the purpose set forth.

3. In an emasculator, the combination of a handle-equipped slotted blade having a knife-edge on one side and its opposite side provided with a serrated edge and severed at its rear end from the handle, and a handle-equipped blade provided with a knife-edge and a serrated edge and working in the slot of the first-named blade with a thumb-screw pivotally connecting the blades and engaging an opening in the free-end portion of said severed side, for the purpose set forth.

4. An emasculator comprising, in combination, a handle terminating in a slotted curved blade having one side formed integral therewith and provided with a knife-edge, and the opposite side fastened thereto at its forward end with an interposed spacing block and free at its rear end, a second handle passing through the slot of the first-named blade and terminating in an approximately semi-circular blade provided with a knife-edge and a serrated edge, and a thumb-screw pivotally connecting said blades and engaging a threaded opening in the free-end portion of said fastened blade, for the purpose set forth.

IRA PASLEY.

In presence of—
R. A. RAYMOND,
PAULINE BECKMAN.

---

Copies of this patent may be obtained for five cents each, by addressing the "Commissioner of Patents, Washington, D. C."